United States Patent [19]

Bleazey

[11] 4,262,174
[45] Apr. 14, 1981

[54] TRACK SKIPPER FOR VIDEO DISC PLAYER

[75] Inventor: John C. Bleazey, Trenton, N.J.

[73] Assignee: RCA Corporation, New York, N.Y.

[21] Appl. No.: 39,359

[22] Filed: May 15, 1979

[51] Int. Cl.³ .................................................. G11B 21/00
[52] U.S. Cl. .................................... 369/221; 360/10; 360/78; 369/41; 369/50
[58] Field of Search .................. 358/128, 128.5, 128.6; 179/100.3 V, 100.1 G, 100.4 D, 100.41 K, 100.41 M; 360/10, 11, 75, 77, 78, 107, 108, 109

[56] References Cited

U.S. PATENT DOCUMENTS

| | | | |
|---|---|---|---|
| 3,963,860 | 6/1976 | Burrus | 358/128 |
| 3,963,861 | 6/1976 | Crooks | 358/128 |
| 3,973,080 | 8/1976 | Dickopp et al. | 358/128 |
| 3,993,863 | 11/1976 | Leedom et al. | 358/128 |
| 4,152,727 | 5/1979 | Tatsuguchi et al. | 358/128 |
| 4,160,268 | 7/1979 | Goto et al. | 358/128 |
| 4,164,756 | 8/1979 | Toda et al. | 358/128 |
| 4,170,783 | 10/1979 | Tajima | 358/128 |
| 4,183,059 | 1/1980 | Palmer | 358/128 |

FOREIGN PATENT DOCUMENTS 1469483 4/1977 United Kingdom .
2016785 9/1979 United Kingdom .

*Primary Examiner*—Stuart N. Hecker
*Assistant Examiner*—Donald McElheny, Jr.
*Attorney, Agent, or Firm*—E. M. Whitacre; J. S. Tripoli; D. A. Kulkarni

[57] ABSTRACT

In a video disc player, a carriage is subject to translatory motion in correlation with radial motion of a playback stylus relative to a disc record disposed on a rotatable turntable. A stylus arm carrying the stylus at one end thereof has the other end secured to the carriage by means of a compliant rubber coupler. A magnetic element is disposed on the stylus arm near its free end. An electromagnet is fixedly mounted in the carriage adjacent to the stylus arm-mounted, magnetic element. The electromagnet is selectively actuated to cause a change in the radial location of the stylus.

2 Claims, 9 Drawing Figures

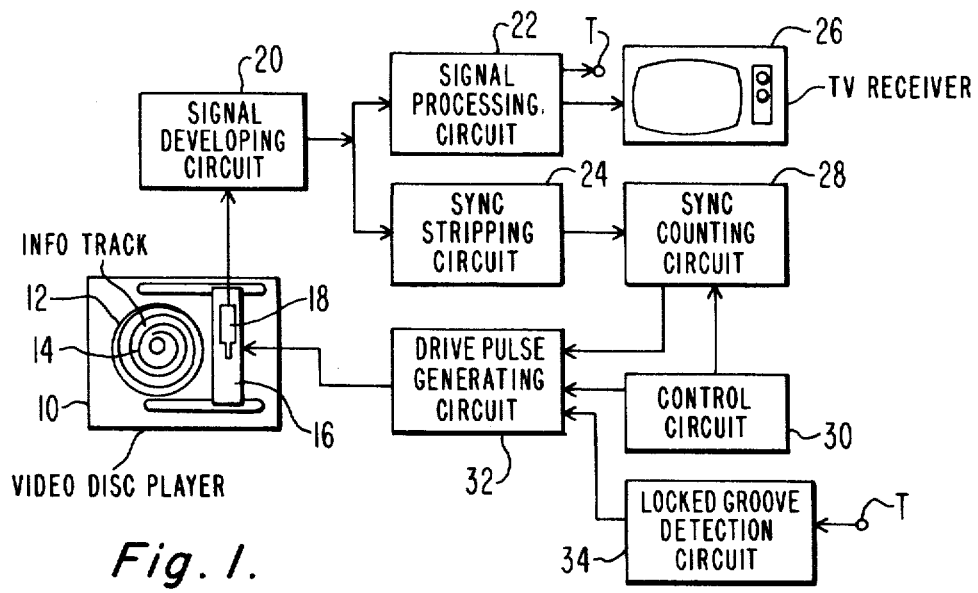
Fig. 1.
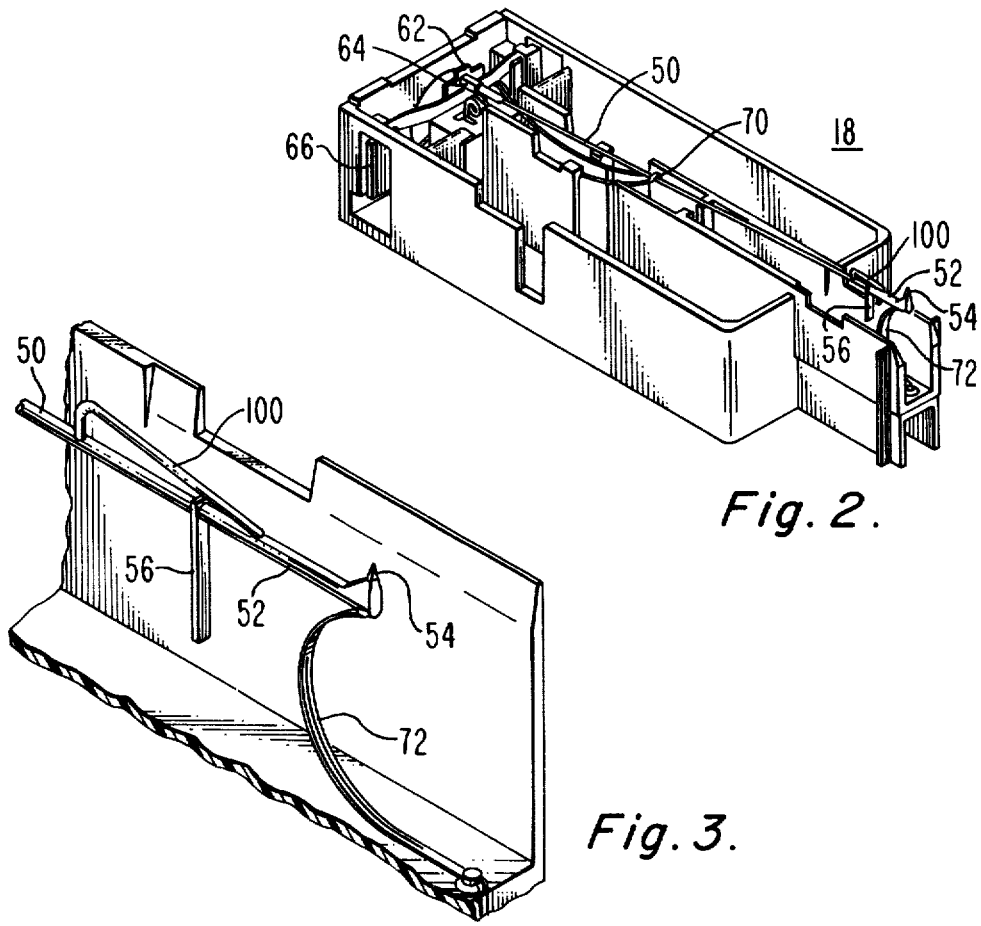
Fig. 2.
Fig. 3.

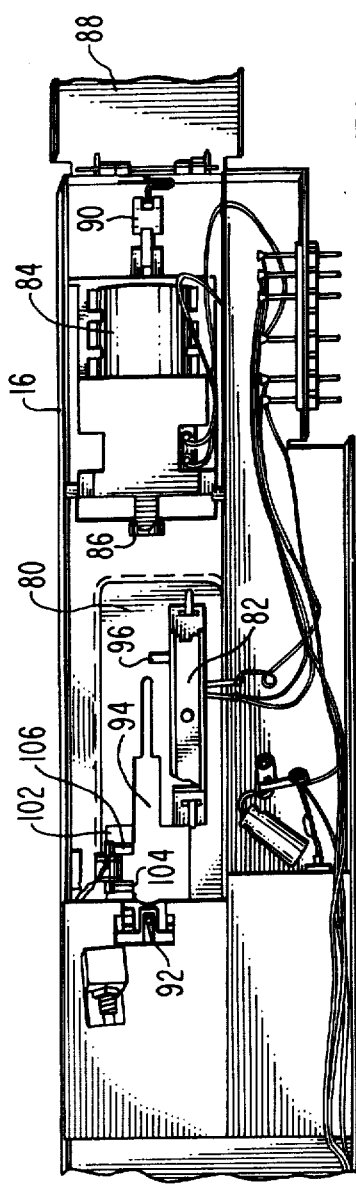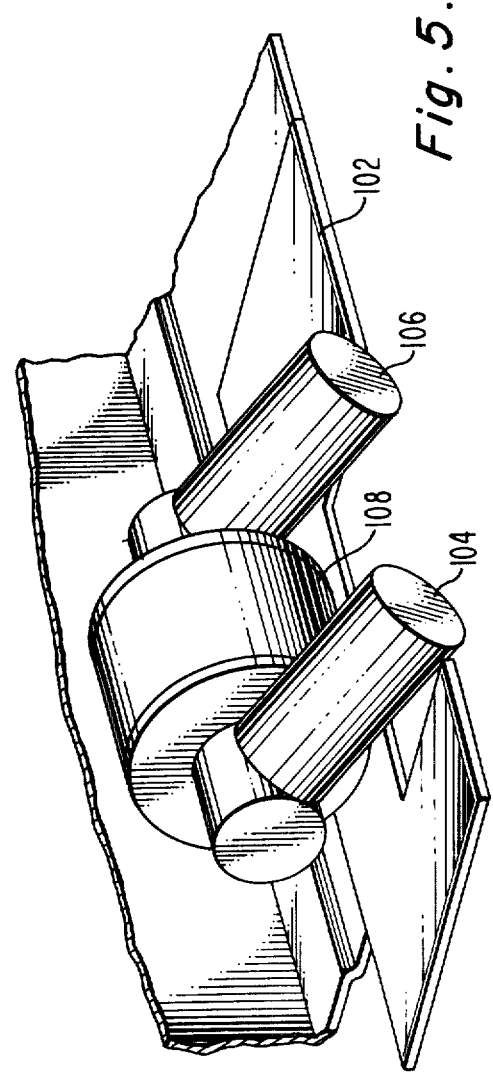

TRACK SKIPPER FOR VIDEO DISC PLAYER

This invention pertains to an apparatus utilized in the playback of a video disc record, and more particularly, to an apparatus for selectively repositioning a player stylus from one convolution to another of a signal-encoded spiral track disposed on the record surface.

U.S. Pat. No. 3,842,194, issued on Oct. 15, 1974 to Jon K. Clemens, is illustrative of a video disc playback system of the variable capacitance form. In an arrangement therein disclosed, an information track incorporates geometric variations in the bottom of a spiral groove in a disc, the surface of which comprises conductive material covered with a thin coating of dielectric material. Variations in the capacitance presented between a conductive electrode on a tracking stylus and the conductive material of the disc occur as the disc is rotated by a supporting turntable. The capacitance variations are sensed to recover the recorded information.

In certain applications of video disc systems such as, for example, the Clemens type, it may be desirable to provide repeat plays of the displayed image. That is, to repetitively provide output signals of basically the same displayed image on an associated television monitor. Such image repeat play may be desirable for allowing a viewer to observe a particular image for relatively long lengths of time.

A further desirable feature for incorporation with a video disc player is the ability to provide rapid forward motion or reverse motion of the displayed image. A rapid forward function is particularly useful for quickly scanning information recorded on the video disc. A reverse motion function may also be utilized for aiding in data retrieval, and is particularly useful as a teaching aid for reviewing an instructional picture sequence recorded on the disc.

Moreover, in the playback of video disc records conditions are occasionally encountered when the presence of some form of defect, for example a defect in the disc groove, causes the player stylus to skip across convolutions of the information track rather than follow the successive convolutions of the spiral track in a regular progression toward one extremity thereof. For example, as the defect is encountered, the stylus may be deflected into repeat traversal of one or more previously traversed convolutions. In some instances, the outward deflection of the stylus is repeated for a substantial number of successive encounters with the defect. This condition is herein referred to as a "locked groove" condition, producing repetitive replay of the same recorded information, with annoying effects on picture display and accompanying sound reproduction.

To provide special effect features (e.g., repeat play, fast forward, reverse, trick plays, etc.) and to advance the stylus out of a locked groove, it is desirable to provide a selectively actuated apparatus for repositioning the pickup stylus from one convolution to another of the record spiral track.

U.S. Pat. No. 3,963,961, issued on June 15, 1976 to H. N. Crooks, and U.S. Pat. No. 3,993,863, issued on Nov. 23, 1976 to Leedom, et al., describe illustrative groove skipping systems. In these systems, selectively actuated piezoelectric bimorph elements cause lateral shifting of the stylus-carrying end of the stylus arm.

A concurrently filed application Ser. No. 039,358, filed on behalf of E. D. Simshauser, entitled "TRACK SKIPPER APPARATUS FOR A VIDEO DISC PLAYER", and, assigned to the assignee of the present invention shows another form of a groove skipper apparatus.

An advantageous arrangement for selectively indexing the stylus from one convolution to another is herein described. Pursuant to this invention, the apparatus includes a playback stylus attached to the stylus arm near its free end. A rubber coupler secures the other end of the stylus arm to a carriage, which is subject to translation in correlation with the motion of the stylus toward the record center during playback. Disposed near the free end of the stylus arm is a magnetic element. An electromagnet is fixedly mounted in the carriage in the vicinity of the magnetic element. Actuation of the electromagnet results in a change in the radial location of the stylus in the appropriate direction.

A desirable feature of this invention is that the net force experienced by the stylus arm is relatively independent of the position of the stylus. For example, in the event of a number of locked grooves occurring on a record, the stylus arm is repeatedly advanced toward the record center by the indexing apparatus of this invention. The movement of the stylus arm toward the record center reduces the spacing between the stylus arm-mounted, magnetic element and the electromagnet, and also develops a mechanical bias urging the stylus arm away from the record center because of the rear rubber coupler. This mechanical bias is automatically compensated for in the instant apparatus since the force on the stylus arm is increased automatically because of the reduction in the spacing between the magnetic element and the electromagnet.

In accordance with a further embodiment, an electromagnet is placed on each side of the stylus arm-mounted, magnetic element to selectively effect forward (i.e. toward the record center) as well as reverse motion of the stylus. Alternately, the combination of a stylus arm-mounted, permanent magnet and a single electromagnet can be substituted for the foregoing arrangement to effect forward and reverse motion of the stylus.

In the drawings:

FIG. 1 is a block diagram representation of a video disc player incorporating the track skipper apparatus of this invention;

FIG. 2 illustrates a pickup cartridge suitable for use in the video disc player of FIG. 1;

FIG. 3 shows an enlarged view of a portion of the pickup cartridge of FIG. 2;

FIG. 4 depicts a carriage having a compartment for receiving the pickup cartridge of FIGS. 2 and 3;

FIG. 5 is an enlarged view of a portion of the carriage of FIG. 4;

Figure 6:
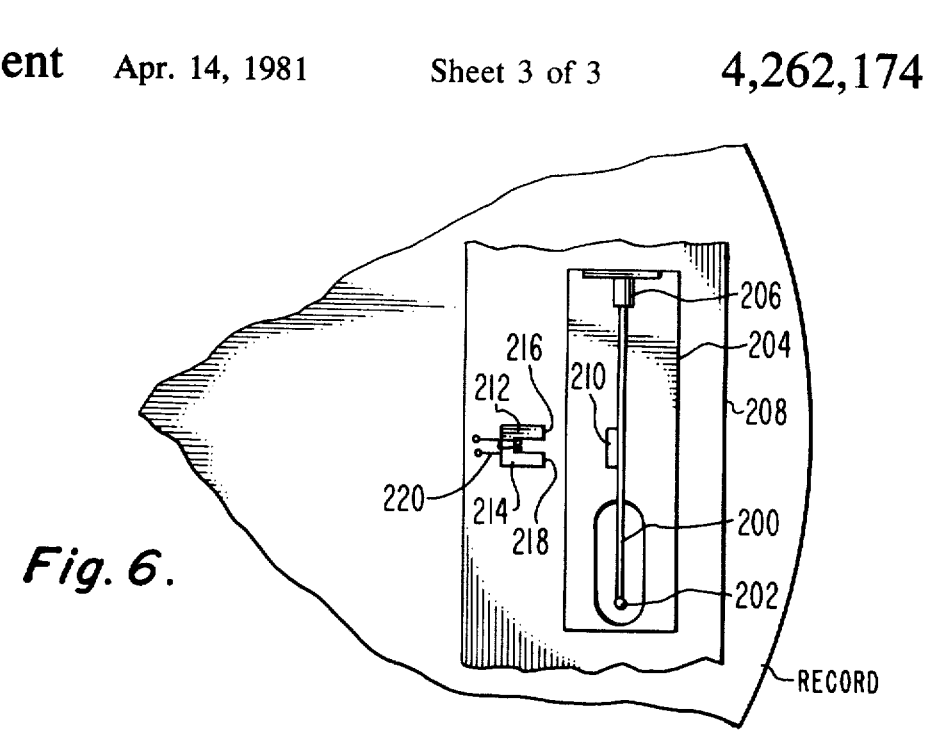
Figure 7:
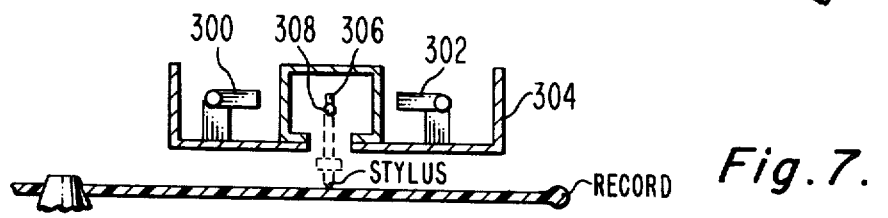
Figure 8:
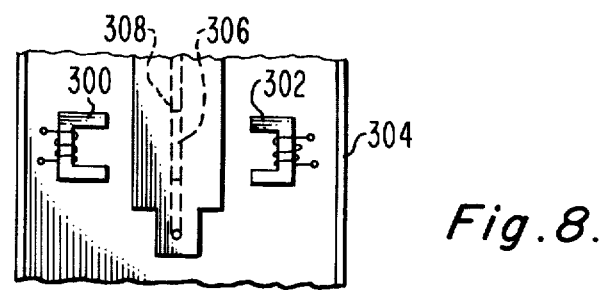
Figure 9:
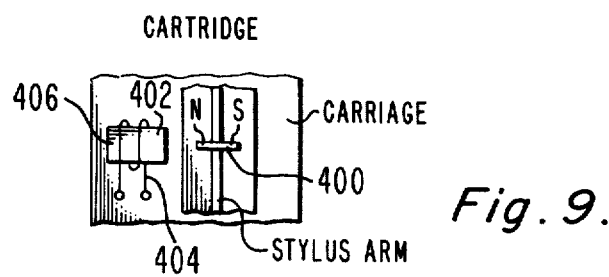

FIG. 6 diagrammatically illustrates another embodiment of the track skipper apparatus of this invention suitable for use with the video disc player of FIG. 1;

FIGS. 7 and 8 show a still further embodiment of the track skipper apparatus of this invention also suitable for use with the video disc player of FIG. 1; and FIG. 9 illustrates another embodiment of the invention suitable for use with the video disc player of FIG. 1.

FIG. 1 represents a video disc playback system incorporating circuitry utilized for operating the track skipper apparatus of this invention. The circuitry shown in FIG. 1 is of the type described in the Crooks (U.S. Pat. No. 3,963,861) and Leedom et al. (U.S. Pat. No. 3,993,863) patents. A video disc player 10 has a turntable 12 for rotatably supporting a video disc 14 having a spiral information track disposed thereon. A carriage 16, having a compartment for removably receiving a pickup cartridge 18, is subject to translation in synchronism with the motion of the playback stylus towward the record center during playback. The carriage drive mechanism illustratively may be of the type described in U.S. Pat. No. 3,870,835 (Stave).

Capacitance variations between the record and an electrode incorporated in the playback stylus are coupled to a signal developing circuit 20 wherein decoding occurs and a composite video signal developed. The signals developed by the signal developing circuit 20 are coupled to a signal processing circuit 22 and a sync stripping circuit 24. The signal processing circuit 22 rearranges the luminance and chrominance constituents of the video signal into a format (such as NTSC) suitable for decoding by a television receiver 26. Sync signals provided by the sync stripping circuit 24 are coupled to a sync counting circuit 28, which in response to signals from a control unit 30 provides an output signal which repetitiously occurs at a predetermined whole number division of the frequency of the applied vertical sync signals. A drive pulse generating circuit 32 receives signals from both the sync counting circuit 28 and the control circuit 30, and responsively provides appropriate control pulses. These control pulses are applied to the track skipper apparatus for selectively causing the playback stylus to skip in the forward and the reverse direction depending upon the manner in which the control pulses are applied.

To provide the repeat play function, the playback stylus is repeatedly repositioned to an adjacent outer convolution of the spiral track disposed on the record once each revolution of the record by means of the instant track skipper apparatus. The drive pulse generating circuit 32 responsive to the control circuit 30 and the sync counting circuit 28, provides appropriate pulses at the once-around rate of the turntable to cause the stylus to skip backward once each revolution.

The fast forward function may be implemented by causing the pickup stylus to skip forward, for example, once every one-half revolution of the record. Similarly reverse motion may be effected by causing the stylus to skip backward once every one-half convolution of the record.

For locked groove clearance purposes, detection circuitry 34 of the type delineated in U.S. Pat. No. 3,963,860 (Burrus) may be utilized to detect the occurrence of a locked groove condition. The stylus is advanced in the forward direction by actuation of the subject track skipper apparatus upon generation of a locked groove recognition pulse. A track skipper apparatus in accordance with the instant invention will now be described in detail with reference to FIGS. 2-5. Shown in FIG. 2 is the pickup cartridge 18. The cartridge comprises a stylus arm 50 which carries at the free end thereof a stylus holder 52. A pickup stylus 54 is secured to the stylus holder 52. An extension 56, disposed on the stylus holder 52, is interposed between a pair of non-magnetic, plastic bumpers (not shown) mounted on the carriage 16. The bumpers serve to limit side-to-side excursion of the stylus 54.

The other end of the stylus arm 50 is secured to a connector plate 62 via a compliant coupler 64. A flexible diaphragm 66 secures the connector plate 62 to the cartridge body 68. A U-shaped spring 70 serves to retain the stylus assembly within the confines of the cartridge 18 during storage and handling. A conductive leaf spring 72 connects an electrode incorporated in the stylus (not shown) to a terminal (not shown) disposed on the cartridge 18.

Cartridge 18 is removably received in the carriage 16 (FIG. 4). As previously indicated, the carriage is subject to translation toward the record center in correlation with the radial motion of the stylus during playback, for example, in the manner described in U.S. Pat. No. 3,870,835 (Stave).

Mounted in the carriage 16 are a stylus arm lifting/lowering mechanism 82 and an arm stretcher apparatus 84. The stylus arm lifting/lowering mechanism is of the type described in U.S. Pat. No. 4,053,161 issued to J. C. Bleazey, et al. on Oct. 11, 1977. The lifting/lowering mechanism serves to gently lower the pickup stylus 54 on the video disc for playback. The mechanism 82 also serves to lift the stylus away from the record, for example, for allowing the stylus to clear the peripheral bead of the record as the carriage is translated from the off-record, rest position to the on-record, play position, or for example, when the player is in the pause mode.

As shown in FIG. 4, the arm stretcher apparatus 84 is provided with a support 86. When the cartridge 18 is installed in the compartment 80 and the lid 88 of the carriage 16 is closed, a mechanism 90, responsive to the lid movement, effects engagement between the connector plate 62 of the cartridge and the support 86 of the arm stretcher. The mechanism 90 also serves to effect engagement between the cartridge terminal and another terminal 92 disposed on the carriage 16 for electrically connecting the stylus electrode to the rest of the player circuitry. The support 86 of the arm stretcher apparatus 84 imparts translatory motion to the stylus arm in a manner that opposes cyclical deviations in the stylus/record relative velocity during playback. The cyclical deviations in the stylus/record relative velocity result from a number of sources, for example, eccentricity, warp, etc. U.S. Pat. No. 3,983,318 (Miller) describes an illustrative arm stretcher apparatus.

The bottom wall of the carriage has an opening 94 for permitting the playback stylus to protrude therethrough during playback to effect stylus/record engagement when the stylus arm is lowered by the stylus arm lifting/lowering mechanism 82.

A lever (not shown) disposed on the lid 88 serves to defeat the U-shaped, stylus arm retaining spring allowing the stylus arm to rest on an arm 96 of the lifting/lowering mechanism 82, when the lid is closed after installing the cartridge 18 in the carriage compartment.

Secured to the stylus arm 50, near its free end, is a magnetic element 100 (FIGS. 2 and 3). An electromagnet 102 is fixedly mounted in the carriage such that the pole faces 104 and 106 thereof are disposed adjacent to the stylus arm-mounted magnetic element. A winding 108 (FIG. 5) of the electromagnet is coupled to the drive pulse generating circuit 32 of FIG. 1. Actuation of the electromagnet causes the poles to exert a pull on the stylus arm-mounted magnetic element, which results in a radially inward displacement (i.e., forward motion) of the stylus. If both forward and backward motion of the stylus is desired, an electromagnet may be provided on each side of the magnetic element in the manner described subsequently.

In the embodiment shown in FIG. 6, a stylus arm 200 carrying a stylus 202 at one end thereof, has the other end secured to a pickup cartridge 204 by a compliant rubber coupler 206. The pickup cartridge is received in a translatably-mounted carriage 208. A magnetic element 210 is secured to the stylus arm 200 at a distance from the stylus 202. An electromagnet 212 is fixedly mounted in the carriage in the vicinity of the magnetic element. The electromagnet 212 comprises a horseshoe-shaped core 214 having pole faces 216 and 218, and a winding 220 disposed about the central portion of the core. An actuating signal, for example, indicative of a backward groove skip due to a locked groove, is applied to the winding to advance the stylus in the forward direction in order to avoid undesirable repeat play. The number of convolutions that are skipped every time the electromagnet is pulsed is a function of the magnitude of the actuation pulse and the distance between the magnetic element 210 and the electromagnet 212.

A still further embodiment of this invention is shown in FIGS. 7 and 8. As shown therein, electromagnets 300 and 302 are disposed in the carriage 304 on opposite sides of a magnetic element 306 mounted on the stylus arm 308. Forward and backward motion of the stylus can be obtained by energizing the inner and the outer electromagnets 300 and 302 respectively. Alternately, the combination of a stylus arm-mounted, permanent magnet 400 and a single electromagnet 402 can be substituted, as shown in FIG. 9, for the foregoing arrangement to effect forward and reverse motion of the stylus. The direction of motion of the stylus is controlled by the direction of the current flow through the winding 404 disposed about the core 406 of the electromagnet.

In a video disc system which utilizes a grooved information track, the application of control signals to the electromagnet and the resulting magnetic forces which are applied to the permanent magnet positioned on the stylus arm cause the stylus arm to experience the desired radial movement. When the stylus arm is thus being radially moved it is believed that the stylus tip rides up the groove wall in one convolution and down the groove wall of the adjacent convolution, or, if a large signal is applied, down the groove wall several convolutions away from the starting convolution. As a result of the positioning of the permanent magnet on the stylus arm, or, at least in the near vicinity of the plane in which the stylus arm lies during playback, the application of the magnetic forces causes the generally lateral movement in the radial direction of the stylus tip in the manner described.

The track skipper arrangement described herein will be useful in many video disc systems over and above the general system environment described herein for illustrative purposes. Without limitation, the present track skipper may be utilized in systems with grooved as well as grooveless discs.

What is claimed is:

1. In a system for recovering prerecorded information from a disc record having a spiral information track by a track-following stylus when stylus/record relative velocity is established; wherein normal operation of said system involves sensing of said prerecorded information along successive convolutions of said spiral track in a regular progression toward one extremity; an apparatus comprising:
  (A) a carriage subject to translatory motion in correlation with radial motion of said track-following stylus during playback; said carriage having an opening in a bottom wall thereof;
  (B) a stylus arm having a longitudinal axis, and carrying said track-following stylus at one end thereof;
  (C) means for yieldably securing the end of said stylus arm remote from said one end to said carriage; said yieldable securing means permitting said track-following stylus to protrude through said opening when said stylus arm is lowered during playback;
  (D) a permanent magnetic element secured to said stylus arm near said one end thereof and disposed above said stylus arm relative to said record during playback;
  (E) an electromagnet for providing a controllable magnetic field of a desired polarity when energized;
  (F) means for mounting said electromagnet to said carriage in the vicinity of said permanent magnetic element; and
  (G) means for selectively energizing said electromagnet to cause a shift in the radial location of said track-following stylus in a substantially radial direction, said radial direction depending upon the polarity of said controllable magnetic field.

2. The apparatus as defined in claim 1 wherein said magnetic element is permanently magnetized in a given direction; said electromagnet comprising a core and a winding disposed about said core; said apparatus further including means for passing current through said winding; the direction of motion of said stylus being determined by the direction of the current passing through said winding.

* * * * *